3,219,652
PROCESS OF POLYMERIZING ETHYLENE IN THE PRESENCE OF A ZIEGLER-TYPE CATALYST AND A POLYETHER OR HYDROXYETHER
Robert W. Hill, Leawood, and Robert L. Batchelor, Olathe, Kans., assignors, by mesne assignments, to Gulf Oil Corporation, Pittsburgh, Pa., a corporation of Pennsylvania
No Drawing. Filed Aug. 18, 1960, Ser. No. 50,322
8 Claims. (Cl. 260—94.9)

This invention relates to synthetic polymers. More particularly, this invention is concerned with novel catalyst compositions and processes of producing resinous polyethylene using the catalyst compositions.

It is known that Ziegler-type catalysts polymerize ethylene at low temperatures and pressures to form resinous polyethylene. By Ziegler-type catalyst is meant a catalyst formed by combining an organometallic compound in which the metal is from Groups IIA, IIB and IIIA of the Periodic Table in Deming's "General Chemistry" (5th Ed.), John Wiley and Sons, which is reprinted in the "Handbook of Chemistry and Physics," 31st Ed. (1949), Chemical Rubber Publishing Co., p. 336, with a halide of a transition metal from Groups IVB, VB or VIB of the same Periodic Table.

Some of the transition metal halides used in producing a Ziegler-type catalyst are the chlorides and bromides of titanium, zirconium, vanadium, chromium, molybdenum and tungsten with the titanium and vanadium trichlorides and tribromides being preferred.

Particularly suitable organometallic compounds are the alkyl, and especially the lower alkyl, compounds of metals of Groups IIA, IIB and IIIA of the Periodic Table, such as aluminum, zinc, cadmium and, beryllium. Organometallic compounds in which the metal is attached to cycloalkyl radicals or aromatic radicals, as well as halogenated compounds such as the dialkyl aluminum chlorides, are also suitable.

Examples of suitable organometallics useful in forming the Ziegler-type catalyst are the dialkyl cadmiums such as diethylcadmium, dimethylcadmium and diisobutylcadmium, the dialkylzincs, such as diethylzinc and dibutylzinc, the alkylaluminums such as triethylaluminum, triisobutylaluminum, diisobutylaluminum hydride and diethylaluminum chloride, diethylberyllium, and the aryl metal compounds such as diphenylcadmium and dinaphthyl zinc.

The Ziegler-type catalyst is conveniently produced by reacting the organometallic compound with the metallic halide in the presence of a hydrocarbon solvent such as isooctane, n-heptane or benzene. The molar ratio between the organometallic compound and the halogenated metal may be varied within wide limits. A ratio of about 0.25 to about 4 moles of halogenated compounds, such as a titanium or vanadium trichloride, to 1 mole of the organometallic compound is suitable. A typical catalyst system could be composed of triisobutylaluminum and titanium trichloride combined in an equimolar ratio.

Polymerization of ethylene with a Ziegler-type catalyst is usually effected by contacting ethylene with the catalyst in the presence of an inert solvent such as benzene or a saturated hydrocarbon like isooctane, n-hexane, pentane, decane or cyclohexane. The reaction is generally effected at a temperature of about 0 to 200° C., preferably at 25° to 150° C., and at pressures of about atmospheric or slightly above.

According to the present invention it has been discovered that effecting the polymerization of ethylene with an additive modified Ziegler-type catalyst results in a significant increase in the polymerization rate and/or polymer linearity as evidenced by increased density and a minimum of chain branching, as well as control of the molecular weight of the polyethylene. These additive modified catalysts comprise the combination of an organometallic compound and a transition metal halide of a conventional Ziegler-type catalyst and a polyether or hydroxyether.

Advisably, the additive components are polyethers or hydroxyethers which for unsymmetrical cyclic complexes with metal atoms. The most useful additive components are the compounds of the formula $$A—O—CH_2—Z$$

wherein A is hydrogen or a hydrocarbon group and Z is an oxygen containing cyclic group, such as tetrahydrofuryl, or groups represented by —Y—O—B in which B is a hydrocarbon group different than, and advisably one which is not a homolog of, any represented by A, and Y is a lower alkylene, and advisably methylene, or a hydroxy containing lower alkylene such as

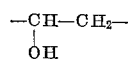

In addition, A and B can be hydrocarbon groups containing one or more ether groups.

Representative polyethers and hydroxyethers that can be used in the process are 1,3-dimethoxy-2-propanol, methyl tetrahydrofurfuryl ether, triethylene glycol dimethyl ether, diethylene glycol dimethyl ether, tetraethylene glycol dimethyl ether, n-hexyl cellosolve and ethylene glycol hexyl methyl ether.

The catalysts useful in the process of this invention are conveniently formed by combining at least one polyether or hydroxyether additive component with a transition metal halide and organometallic compound of a conventional Ziegler-type catalyst system in an inert solvent. Thus, by way of illustration, the additive can be added to titanium or vanadium trichloride prior to the addition of the organometallic compound, or the catalyst components can be added to an inert solvent present with the ethylene to be polymerized. Furthermore, two or more additives can be used if desired.

In general, up to about 0.60 mole of additive per mole of transition metal halide is effective in increasing the polymerization rate and/or density of the polyethylene. However, about 0.05 to about 0.3 mole of additive for each mole of transition metal halide is advisably used.

The modified catalyst is conveniently prepared by first combining the transition metal halide with the polyether or hydroxyether additive in an inert solvent, and advisably in an inert atmosphere, and adding the organometallic component to the resulting slurry. The ethylene can then be added to the catalyst slurry at polymerization temperature or the catalyst slurry can be transferred to a polymerization reactor. Alternatively, the ethylene can be present during the formation of the catalyst.

The most active catalysts are those prepared from the transition metal halides having a valence of 3 or less, such as titanium trichloride and vanadium trichloride. The most useful catalysts for polymerizing ethylene appear to be those prepared from an alkylaluminum, an additive and a vanadium or titanium halide and particularly the trichlorides thereof.

The polymerization of ethylene employing the catalyst of this invention is readily effected using the same solvents as discussed above for the polymerization using the conventional Ziegler-type catalysts.

The polymerization reaction can be effected from room temperature to 105° C. or higher with the process preferably being effected at 60° C. to 85° C. It is important to note, however, that the additive modified catalyst may be preformed or activated at temperatures higher or lower than those used in the ethylene polymerization itself. Temperatures of catalyst formation higher than used in the polymerization may be necessary for activation, while catalyst formation at lower temperatures than used in the polymerization may be needed to avoid thermal instability of the catalyst in the absence of ethylene.

Polymerization may be effected at any convenient pressure. Atmospheric pressure or slightly higher such as 30 p.s.i.g. is particularly suitable although higher pressures can be used, but are not needed.

At completion of the polymerization reaction, the polymer slurry is filtered to isolate the resinous polyethylene. The solid product so obtained is then freed of catalyst residues by any of several known techniques. One method is to stir a slurry of the polyethylene in an alcohol such as methanol and then remove the insoluble resinous polyethylene by filtration to give a friable white product.

Copolymers of ethylene with other olefins such as propylene and butylene can also be prepared by use of the catalysts of this invention.

The polymerization can be adapted readily to a continuous process under the proper conditions.

When a dialkylaluminum hydride is used as the organometallic component of the catalyst it may be conveniently prepared by heating the corresponding trialkylaluminum compound in an inert solvent such as n-decane at an elevated temperature such as about 125° to 170° C. However, the mode of preparation appears to result in no significant difference in activity of the hydride.

The following examples illustrate the invention.

EXAMPLE 1

0.5 gm. of titanium trichloride was weighed into a 385 ml. reactor bottle in a dry box and covered with 10 ml. of n-heptane. The bottle was stoppered, taken out of the dry box and filled with heptane to bring the total volume of heptane to 185 ml. The reactor bottle was fastened into a heating jacket on a modified Parr shaker and 5 ml. of a 0.1 molar solution of the additive added followed by 10 ml. of a 0.9 molar solution of diisobutylaluminum hydride in decane. The reactor was heated and agitated and when it reached 75° C., the reactor was pressurized to 30 p.s.i.g. with ethylene and the pressure maintained constant. The polymerization was effected at 75° C. The amount of ethylene gas taken up was recorded. To determine the polymerization rate the pressure drop in the reservoir was converted to grams of ethylene consumed and then plotted against time. The slope of the curve was taken as the polymerization rate in grams per hour.

The polymerization was terminated, the bottle cooled and the contents filtered through a cloth filter with suction. The solid, insoluble product obtained by filtration was stirred with several portions of methanol in a Waring blender until the solid and supernatant liquids were colorless. The solid was then dried to give a friable white product.

The measure of molecular weight was the logarithmic viscosity number (LVN) measured in tetralin at 135° C. (See Billmeyer, Textbook of Polymer Chemistry, Interscience Publishers, Inc., 128 (1957).

The results of the polymerization experiments are shown in Table 1.

*Table 1*

| Run No. | Additive | Rate, g./hr. | LVN | $CH_3/1,000$ | Density |
|---|---|---|---|---|---|
| 318 | None | 5.6 | Insol | Trace | 0.939 |
| 320 | do | 5.3 | 7.86 | do | 0.939 |
| 423B | n-Hexyl cellosolve | 7.44 | Insol | do | 0.947 |
| 443 | 1,3-dimethoxy-2-propanol | 48.5 | Insol | 0.22 | 0.9683 |
| 444 | do | 46.0 | Insol | 0.14 | 0.9637 |
| 447 | Tetraethylene glycol dimethyl ether | 5.2 | Insol | 0.12 | 0.9620 |
| 453 | Ethylene glycol hexyl methyl ether | 6.9 | Insol | Nil | 0.9525 |
| 454 | do | 6.9 | Insol | Trace | 0.9529 |
| 457 | Triethylene glycol dimethyl ether | 9.4 | Insol | do | 0.9592 |
| 458 | do | 9.0 | Insol | Nil | 0.9609 |
| 459 | Methyl tetrahydrofurfuryl ether | 6.2 | Insol | do | 0.9565 |
| 460 | do | 6.2 | Insol | Trace | 0.9437 |
| 430A | Diethylene glycol dimethyl ether | 21.9 | Insol | Nil | 0.958 |
| 430B | do | 23.5 | Insol | 0.31 | 0.961 |

Example 2

The procedure of Example 1 was followed using vanadium trichloride in place of titanium trichloride and triisobutylaluminum in place of diisobutylaluminum hydride, with the additive shown in Table 2. The results are given in the said table.

*Table 2*

| Run No. | Additive | Rate, g./hr. | $CH_3/1,000$ | Density |
|---|---|---|---|---|
| 653 | 1,3-dimethoxy-2-propanol | 63.0 | 0.65 | 0.9584 |
| 822 | None | 17.0 |  | 0.9435 |
| 823 | do | 15.0 |  | 0.9378 |

Various changes and modifications of the invention can be made and, to the extent that such variations incorporate the spirit of this invention, they are intended to be included within the scope of the appended claims.

What is claimed is:

1. The process of polymerizing ethylene which comprises effecting the polymerization with a catalyst comprising the reaction product of:

(a) an organometallic compound in which the metal therein is selected from the class consisting of the metals of Groups IIA, IIB and IIIA of the Periodic Table;

(b) a transition metal halide in which the metal therein is trivalent and is selected from the class consisting of the metals of Groups IVB, and VB of the Periodic Table, said metal halide containing no atoms other than said metal atoms and said halide atoms; and (c) an additive compound selected from the class consisting of those polyethers and hydroxyethers which form unsymmetrical cyclic complexes with metal atoms, said additive compound being present in an amount sufficient to increase the polymerization rate and density of the polyethylene so produced, as compared with the polymerization rate and density obtained in the absence of said additive.

2. Process of claim 1 wherein the metal in the organometallic compound is aluminum.

3. Process of claim 1 wherein the metal in the transition metal halide is titanium.

4. Process of claim 1 wherein the metal in the transition metal halide is vanadium.

5. Process of claim 1 wherein the additive compound is a polyether which forms unsymmetrical cyclic complexes with metal atoms.

6. Process of claim 1 wherein the additive compound is a hydroxyether which forms unsymmetrical cyclic complexes with metal atoms.

7. Process of claim 1 in which the catalyst comprises the reaction product of an aluminum alkyl, a titanium trihalide and said additive compound.

8. Process of claim 1 in which the catalyst comprises the reaction product of an aluminum alkyl, a vanadium trihalide and said additive compound.

References Cited by the Examiner

UNITED STATES PATENTS

| | | | |
|---|---|---|---|
| 2,952,697 | 9/1960 | Gorisch | 260—94.9 |
| 3,050,470 | 8/1962 | Pearson et al. | 260—94.9 |

FOREIGN PATENTS

| | | |
|---|---|---|
| 564,772 | 8/1958 | Belgium. |
| 1,171,450 | 10/1958 | France. |

JOSEPH L. SCHOFER, *Primary Examiner.*

LESLIE H. GASTON, JAMES A. SEIDLECK,
*Examiners.*